United States Patent [19]

Leatham et al.

[11] Patent Number: 5,313,261
[45] Date of Patent: May 17, 1994

[54] METHOD AND APPARATUS FOR FAITHFUL GRAY SCALE REPRESENTATION OF UNDER WATER LASER IMAGES

[75] Inventors: James G. Leatham, Cardiff by the Sea; Raymond H. Bratton, Santee, both of Calif.

[73] Assignee: Applied Remote Technology Inc., San Diego, Calif.

[21] Appl. No.: 912,880

[22] Filed: Jul. 13, 1992

[51] Int. Cl.$^5$ .............................................. G01C 3/08
[52] U.S. Cl. ...................................................... 356/4
[58] Field of Search ......................................... 356/4, 5

[56] References Cited

U.S. PATENT DOCUMENTS

| | | | |
|---|---|---|---|
| 4,707,128 | 11/1987 | Coles | 356/4 |
| 4,829,172 | 5/1989 | Miller | 356/5 X |
| 4,963,024 | 10/1990 | Ulich | 356/5 X |
| 5,068,540 | 11/1991 | Tsuji | 356/4 X |

*Primary Examiner*—Mark Hellner
*Attorney, Agent, or Firm*—John R. Duncan; Frank D. Gilliam

[57] ABSTRACT

In a laser beam X-Y scanning system for use, as for example, in turbid media such as sea water; the laser light reflected from objects is received by an image receiving device or detector such as a photomultiplier tube (PMT). The intensity level of the reflected light is maintained at an intensity level within the dynamic range of the image receiving device by controlling the effective intensity of the laser beam by varying the density of a plurality of series positioned variable neutral density filters positioned between the laser beam generator and the object to be illuminated or the illuminated object and the image receiving device. The light density of each filter is determined by real time environmental conditions and the instantaneous position of the laser light source relative to the object from which the laser light is reflected to the image receiver. The density of each of the plurality of filters is controlled by a computer.

14 Claims, 2 Drawing Sheets

METHOD AND APPARATUS FOR FAITHFUL GRAY SCALE REPRESENTATION OF UNDER WATER LASER IMAGES

BACKGROUND OF THE INVENTION

The invention relates in general to automatic gain control of a system utilizing measured environment parameters to define gain control to be applied, and more particularly to a laser scanning system which automatically controls the laser light intensity directed to an object to be detected in such a manner that the laser light reflected from that object received by the receiver is maintained within the dynamic (gray scale) detection range of the receiver.

Specialized viewing systems can greatly enhance the observation of objects in turbid media; For example, such systems are useful in seawater for salvage and recovery operations or for object detection.

With the advent of the laser, relatively high powered directed illumination of a scene for imaging purposes becomes realizable.

Turbid media viewing systems utilizing laser technology are designed to avoid the deleterious effects of scattering, that is, to separate information containing light from non-information containing light. Conventionally, a method of accomplishing this is to separate the light source from the receiver. The greater the separation, the less scattered light is detected by the receiver. Usually, the source and receiver are as far apart as is permitted by the size of the vehicle upon which they are mounted.

An underwater viewing system can be found in U.S. Pat. No. 4,707,128 by inventor Bryan W. Coles. In this system an emitter, such as a pulsed laser, emits a short pulse of light which travels to a beam splitter where part of the light is transmitted and part is deflected. The transmitted portion passes through optics and is deflected by an X-Y scanning element in such a manner that a portion of an object is illuminated in a point-by-point manner. Light reflected from the object travels back along a path that is coaxial with the path of the transmitted light pulse striking the scanning elements and the beam splitter. The return light deflected by the beam splitter is received by a light sensor, such as a photomultiplier tube.

Other prior art systems consists of similar devices in which an image is manually adjusted, either real-time or based on empirical charts, to achieve an acceptable image at the receiving device.

Alternatively, the prior art also consists of using Automatic Gain Control (AGC), which consists of feeding back an error signal from the received image to adjust the receiver gain to within its dynamic (gray scale) range. This type of derived AGC relies on a historical average for a baseline, requiring a receiving device with a larger detector dynamic range than required of the system of the instant invention to accommodate potential signal drop-outs or spikes.

In some of these state of the art viewing systems, manual adjustments are made consisting of adjusting the gain on a monitor displaying the image in real-time to obtain a picture with discernable intensity levels. This method of maintaining a suitable received image requires the presence of a human operator constantly making adjustments for maximum image quality.

Another method of maintaining a received light image in the dynamic range of the receiving device is through the use of error signal feedback. In this method, the average value of the scene being imaged is fed back to the receiver gain controller. The receiver gain is controlled such that the average value is maintained within the receiver dynamic range. The time constant on such a prior art device can be preset to roughly accommodate the scan angle of the device.

Neither of these two methods incorporates any time dependency in the gain function.

There has not been an automatic means for real time control of the light output intensity of a laser light scanning system in which the intensity of reflected light from an illuminated object is maintained within the dynamic light intensity range of the image receiver until the emergence of the instant invention.

SUMMARY OF THE INVENTION

The invention consists of a method of automatic gain control whereby the received intensity of a source is controlled by computer analyzed data received from fundamental measurements taken from the immediate environment on a real time basis rather than from measurement of a self-generated error signal. This method of gain control is autonomous and continually self correcting. Additionally, it maximizes use of the receiving receiver's available dynamic (gray range) range. The preferred embodiment described here is used in an underwater sensor with an optical receiver. The invention could be envisioned to be used in other environments and with other kinds of sensors. The preferred embodiment requires about 120 dB dynamic range while readily available detectors have only on the order of 40 dB dynamic range.

The sensor consists of a transmit portion, a scanner, and a synchronized scanning receiver. The laser light is collimated and transmitted to the scanner. The scanner is pointed toward the sea floor and scans the beam across the sea floor. It can be visualized that the sea floor is closer to the sensor at nadir, directly below the sensor, than at the edges of the scan. The laser beam traverses the water column to the sea floor, is reflected, and the receiver collects the reflected light as possible. With a pulsed laser the receiver may be on-axis, with near-field backscatter gated out from the return signal; with a continuous wave (CW) laser the received signal may be separated from the laser, so that near-field backscatter is out of the field of view of the receiver. The quality of the gray scale image of a sensor of this sort depends on the accuracy of mapping the relative return powers from different parts of the scene.

In order to implement faithful gray-scale imaging over a large dynamic range, the dynamic range must be broken down into its constituent parts.

The light output intensity of a the laser light optic system is continually adjusted to provide a reflected light intensity from laser illuminated objects to a reflected light receiving device, such as a PMT so as to maintain those reflected light levels reaching the receiver within the dynamic light range (gray scale) of the device.

The light intensity output level of the laser is controlled by three series positioned neutral density filters the density of each of the filters is controlled on a real time basis from a number of environment conditions, namely, scan rate, sensor altitude, scan angle and water attenuation length. The density of two of the filters are controlled by the degree of light transmission through the water combined with the distance of the light source from the bottom surface directly thereunder. One of the two filters controls the intensity within a certain intensity range and when that intensity range is exceeded the second of the two filters is employed to further reduce the laser light intensity. The density of the other or third filter is determined from the scan angle of the laser light to an object.

The laser light source is of sufficient illumination to provide reflected light to the receiver at the receiver's dynamic range (gray scale) under a selected set of most severe environmental conditions i.e. turbid conditions as well as the distance to an object from the laser. At less than the most severe conditions, neutral density filters of a selected density value are placed in front of the laser light exiting the source to maintain an illumination level at the receiver within the receiver's dynamic range so that the receiver continues to receive illumination at substantially the same intensity level for a particular object regardless of the various changes of conditions, distance and scan angles which are expected to continually occur. In essence, an automatic gain control (AGC) is provided for real time dynamic control of the intensity of the received light intensity based on the medium and distance to the object.

The inputs to the system to control the value of the neutral density filters is determined by an onboard computer, as for example, a type VME single board computer or equivalent with an analog voltage input/output card or equivalent thereto which provides separate output control voltages for changing the density of the three neutral density filters according the monitored environmental conditions and scan angle.

The receiver is synchronized with the pulse rate, distance and angle of the scan of the illuminating laser. The laser illumination system chosen to practice this invention is the same or similar to that disclosed in U.S. Pat. No. 4,707,128 or equivalent thereto.

It is an object of this invention to provide a varying intensity underwater laser illumination source so that the reflected light from objects illuminated thereby is received at a receiving device with substantially a constant level of illumination within the density range (gray scale) of that receiving device.

This and other objects and advantages of the present invention will become apparent to those skilled in the art after considering the following detailed specification in which the preferred embodiment is described in conjunction with the accompanying drawing Figures.

DETAILED DESCRIPTION OF THE PREFERRED EMBODIMENT

Figure 1:
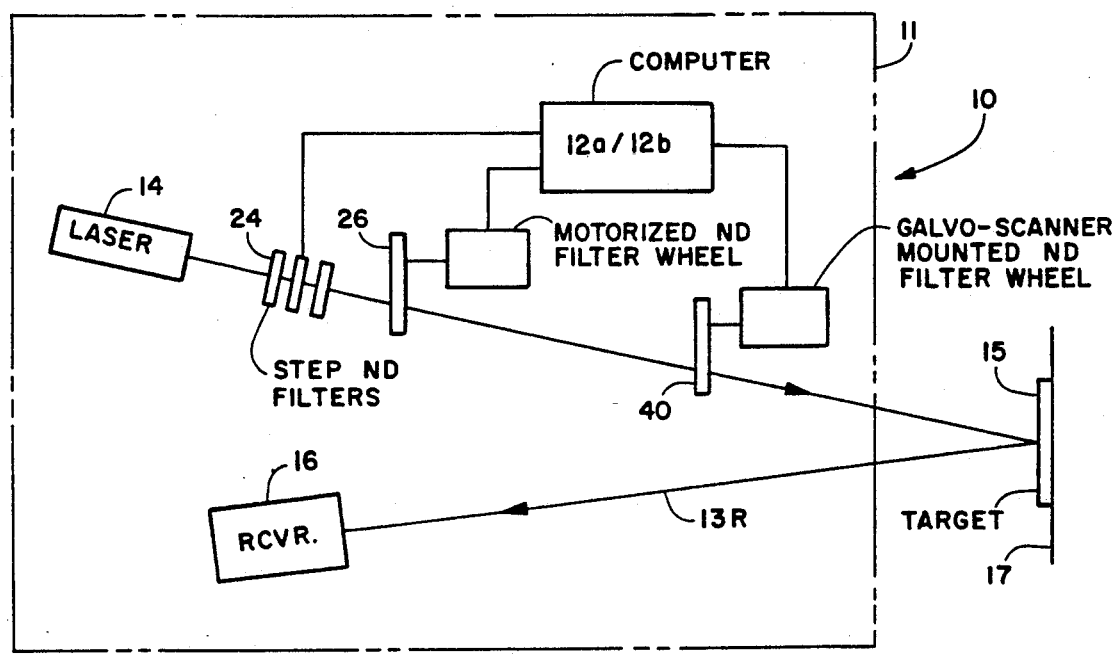
FIG. 1 is a basic overall schematic block diagram showing of the turbid viewing system of the invention and FIG. 2 depicts a more detailed schematic showing of the turbid viewing system of the invention.
Figure 2:
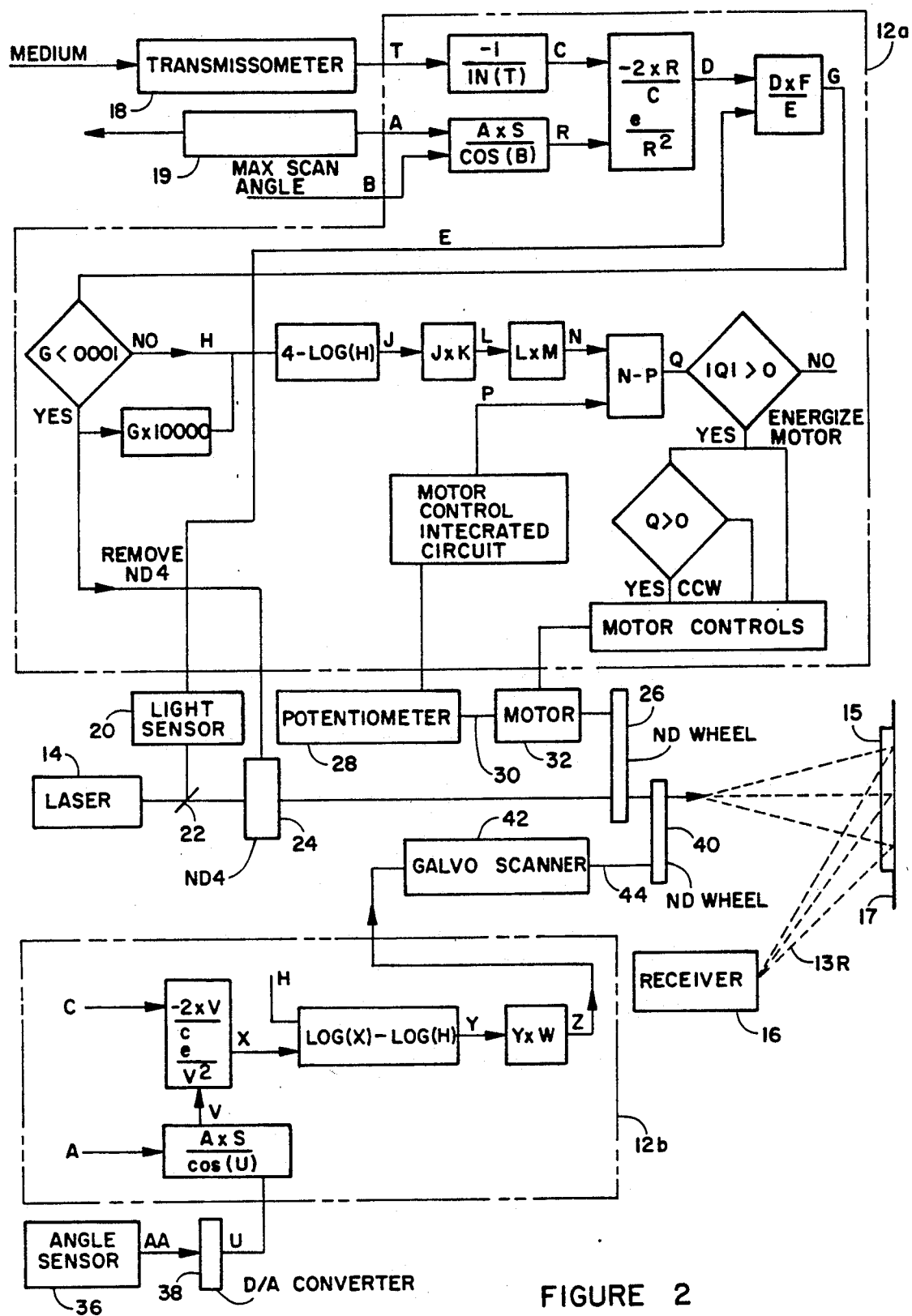

Referring now to the drawing FIGS. 1 and 2, the drawing Figure denotes the viewing system 10 of the present invention positioned on a platform or support 11. The heart of the control system of the invention is an off of the shelf type VME single board computer of the type (P/N) SV31S040CEB manufactured by Synergy Microsystems of Encinitas, Ca. or equivalent and a VME input/output card of the type P/N VMIVME-4512 manufactured by VME MICROSYSTEMS, of Huntsville, Alabama or an equivalent thereto identified as 12a and 12b. The computer is programmed in a known manner to provide the hereinafter described filter controls for dynamically assuring that the reflected laser light 13R at a receiver which is reflected from an object. The object is illuminated by a collimated laser beam 13 from a laser source 14 through the turbid medium to a object 15 from which it is reflected to a receiver device 16. The basic laser and receiver system may be the same as the laser system set forth in U. S. Pat. No. 4,707,128 or an equivalent thereto. The device 16 for example may be a photodiode of the type (P/N) PIN040A manufactured by UDI-OSI of Hawthorne, Ca. a commonly known multiplier tube (PMT) or the like.

The loss in light transmission through the turbid water is determined by a transmissometer 18 of the type XMS 350-20 manufactured by Martek Instruments, Inc. of Irvine, Ca. or an equivalent thereto. The output of the transmissometer "T" is the % transmission of the medium (water). For the preferred embodiment a one Meter Martek unit is used with an output of 0 to 1 volt for 0 to 100% transmission in water.

The altitude of the light source from the bottom or floor 17 of the water body is established by an Altimeter 19 of the type Model PSA-900 manufactured by Datasonics, Inc. of Cataumet, Ma. or an equivalent thereto. The output of the altimeter "A" for the range of 0–30 meters corresponds to an output voltage of 0 to 10 volts.

The signal "B" represents the maximum scan angle of the laser light device 14 and is typically established at $+/-$ 45 degrees from nadir but the angle is not limited thereto.

Within the computer 12a, 12b the "T" input is processed by conventional programming to produce a signal "C" which is calculated from "T" for a meter length transmissometer: $c = -1/\ln(T)$ where ln is the natural log function.

Signals "A" and "B" are processed together to produce the signal "R" which is determined by dividing the altitude "A" times "S" a scaling value used to convert the voltage output of the altimeter 19 into meters by the cosine of the maximum scanner angle "B" relative to nadir. For the preferred embodiment "S" is 30 meters/10 volts or 3.

The signal "D" is the expected received light intensity scaling factor at the maximum range due to water clarity and spreading. This signal is a well known function produced by the exponential of the negative of the distance divided by the attenuation length divided by "$R^2$". The factor of 2 is used because the distance is from the laser to the object and back. The "$R^2$" compensates for spreading but only from the distance from the object back to the sensor.

The signal "E" represents the intensity output from the laser at light sensor 20 taken from a conventional beam splitter 22. The light sensor and splitter used for this purpose are well known in the art.

The scaler "F" is a value so that E/F = 1 for maximum laser output.

Signal "G" is the normalized received light ratio.

Signal at "H" depends on the value of "G". If "G" is less than 0.0001, "H" = "G" × 10000 otherwise "H" = "G". The neutral density filter (ND) 24 of a magnitude of 4 is removed when "G" is less than 0.0001. The ND filter is of the type P/N 03 FSG 013 manufactured by Melles Griot of Irvine, Ca. or an equivalent thereto.

Signal "J" is produced within the computer by subtracting the log base 10 of signal "H" from 4, the maximum neutral density for the preferred embodiment.

"K" represents a scaling factor to convert the ND filter value of ND wheel filter 26 to an angle. For the preferred embodiment it is 300 degrees/4ND.

Signal "L" represents the product of "J" and "K".

"M" is a scaling factor to convert the angle of the ND filter wheel 26 to an equivalent potentiometer voltage. For the preferred embodiment the potentiometer voltage is 10 volts/320 degrees.

Signal "N" represents the product of "M" and "L".

"P" is the voltage from potentiometer 28. In the preferred embodiment the voltage varies between 0 and 10 volts as the angular position of the potentiometer 28 is varied from 0 to 320 degrees. ND filter wheel is physically attached to the shaft 30 of motor 32. The shaft 30 drives the ND filter wheel 26. The potentiometer 28 provides for sensing the position and hence the ND value of ND filter wheel 26.

The signal "Q" is determined by subtracting signal "P" from the signal "N". This is the error between the desired ND filter wheel (potentiometer) position and the actual position of the ND filter wheel 26. If an error exists, the absolute value of "N" − "P" is greater than 0 the motor 32 is energized. The sign of the difference determines the direction of rotation of motor 32 to eliminate the error.

A motor control integrated circuit 34 interfaces the computer to the motor potentiometer 32. A typical motor integrated circuit is a P/N UDN-2953B manufactured by Sprague of Worcester, Ma. or an equivalent thereto.

An angle sensor 36 of the type Absolute Encoder, P/N T25E-X-HSB1024N-GD1-X-S-CP-X-5 manufactured by BEI Electronics of Santa Barbara, Ca. produces a digital signal "A" which is converted to an analog signal by D/A converter 38 which produces an analog output signal "U". The digital signal "AA" is the output of the angle sensor 36 which measures the scan angle relative to straight down (nadir). The output of the D/A converter 38 provides an analog output "U" that varies from 0 volts straight down to +5 volts at 45 degrees to one side and from 0 to −5 volts at 45 degrees to the opposite side.

A signal "V" is produced within the computer by multiplying the signal "A" from the altimeter 19 with the scaling value "S" and dividing the product by the cosine of "U". The signal "V" is the actual range for the scanner angle, thus "V" is constantly changing as a function of the scanner angle.

The signal "X" is the expected received light intensity scaling factor at the actual range due to water clarity and spreading. This signal is well known function produced by the exponential of the negative of the distance divided by the attenuation length divided by "$V^2$". The factor of 2 is used because the distance is from the object to the sensor and back. The "$V^2$" compensates for spreading but only for the distance from the object back to the sensor.

The log(X) − log(H) produces signal "Y" which represents the ND value of ND filter wheel 40 required for the scanner angle of the viewing system 10.

"W" represents a scaling factor to convert the ND filter value of ND filter wheel 40 of the type P/N 03-FCC-009/F manufactured by Melles Griot of Irvine, Ca. or an equivalent thereto to an input value for the galvanometric scanner 42 of the type P/N MOO-GF325DM manufactured by General Scanning of Watertown, Ma. that will result in the required angular movement for the desired ND value of the filter wheel 40. The ND filter wheel is continuously graded such that any ND value corresponds to a particular angle of the scanner. The scaling factor "W" is a multiplier to map the ND value to an angular position command to input to the scanner. It uses a linear transfer function to determine the value.

Signals "Y" and "W" are multiplied together to produce a signal "Z" which is the input to galvometric scanner 42.

The galvometric scanner 42 is interconnected by a shaft 44 to ND wheel filter 40.

In operation the intensity of the laser beam 1 for highly turbid water is not attenuated by either of the ND filters 24,26 and is attenuated only by the ND wheel filter 40 as the scan angle varies. As the water becomes less turbid ND filter 26 begins to attenuate the laser beam 13 according t the desired range of reflected light 13R at the receiver. If the water 26 is insufficient then ND filter is activated and continues to increase in density as the water becomes even less turbid. At all water turbid conditions the ND wheel filter continues to vary according to the scan angle. At all water turbid within the range of the laser beam intensity and the filtering actions the reflected laser light 13R will fall within the dynamic range of the receiver 16. The receiver may be on-axis with the near-field backscatter gated out from the return signal, or separated from the source, as shown, so back-scatter is out of the field of view of the receiver. Either method of operation is known in this art.

It should be understood that the external sensed AGC of the type described herein can be utilized in other applications for example, in the recording of compact disks in that the dynamic range of the disc can be fully scanned digitally before the recording is begun and the cassette recorder set to an optimal bias point to take full advantage of the dynamic range of the cassette.

While there has been shown and described preferred embodiments of the improved turbid media underwater viewing system in accordance with the invention, it will be appreciated that many changes and modifications may be made therein without, however, departing from the essential spirit thereof.

What is claimed is:

1. An improved under water viewing system for viewing an object at various distances therefrom in water of varying turbidity comprising:
   a light source;
   said object being illuminated by said light source;
   a receiver for receiving reflected light from said object illuminated by said light source;
   light attenuation means; and
   control means for selectively varying said light attenuation means for controlling the effective intensity of said reflected light received by said receiver from said illuminated object within said selected dynamic light receiving range regardless of the distance said system is from said object or the degree of turbidity of said water.

2. The invention as defined in claim 1 wherein said light attenuation means comprises a first variable ND filter.

3. The invention as defined in claim 1 wherein said light attenuation means comprises a first and second variable ND filter, said first ND filter is employed in water having a high degree of turbidity and second ND filter and said first ND filter are employed in water having turbidity lower than said high degree.

4. The invention as defined in claim 1 wherein said light attenuation means comprises a first and a second variable ND filter, said first variable ND filter only is employed when the object is a given distance from said viewing system and both variable ND filters are employed when said object is closer then said given distance.

5. The invention as defined in claim 1 wherein said light source is scanned through a given scan angle and said light attenuation means comprises at least two variable ND filters one of said at least two variable ND filters is varied according to the turbidity of the water and the distance of the object from said viewing system and the other variable ND filter is variable according to the instantaneous angular position of said light source within said selected scan angle.

6. The invention as defined in claim 4 wherein said light source is scanned through a selected scan angle and said light attenuation means comprise a third variable ND filter which is variable according to the instantaneous angular position of said pulsed light source within said selected scan angle.

7. The invention as defined in claim 5 wherein said at least two variable ND filters additionally comprising a third variable ND filter which effectively extends the density range of said one of said at least two variable ND filters.

8. The invention as defined in claim 1 wherein said light source is scanned through a given scan angle and said control means additionally comprises a computer programmed to receive input signals representative of the turbidity of the water, the distance to a surface on which said object rests and the instantaneous angular position of said light source within said selected scan angle and process said input signals to control the magnitude density of said variable gain means.

9. The invention as defined in claim 8 wherein said light attenuation means comprises a pair of variable density ND filters which adjust the intensity of said light source striking said object and a third variable ND filter for effectively adjusting the intensity of said light source for said instantaneous angular position of said light source within said selects can angle.

10. The invention as defined in claim 1 wherein said light source is a laser.

11. The invention as defined in claim 10 wherein said laser light beam is pulsed.

12. The invention as defined in claim 11 wherein said receiver is synchronized with the pulse rate of said laser.

13. The invention as defined in claim 1 wherein said light attenuation means is positioned intermediate said light source and said receiver.

14. An improved under water viewing system for viewing an object at various distances therefrom in water of varying turbidity comprising:
a light source;
said object being illuminated by said light source;
a receiver having a selected dynamic light receiving range for receiving reflected light from the illuminated object; and
control means for selectively varying the intensity of said reflected light received by said receiver from said illuminated object within said selected dynamic light receiving range regardless of the distance said system is from said object or the degree of turbidity of said water.

* * * * *